UNITED STATES PATENT OFFICE.

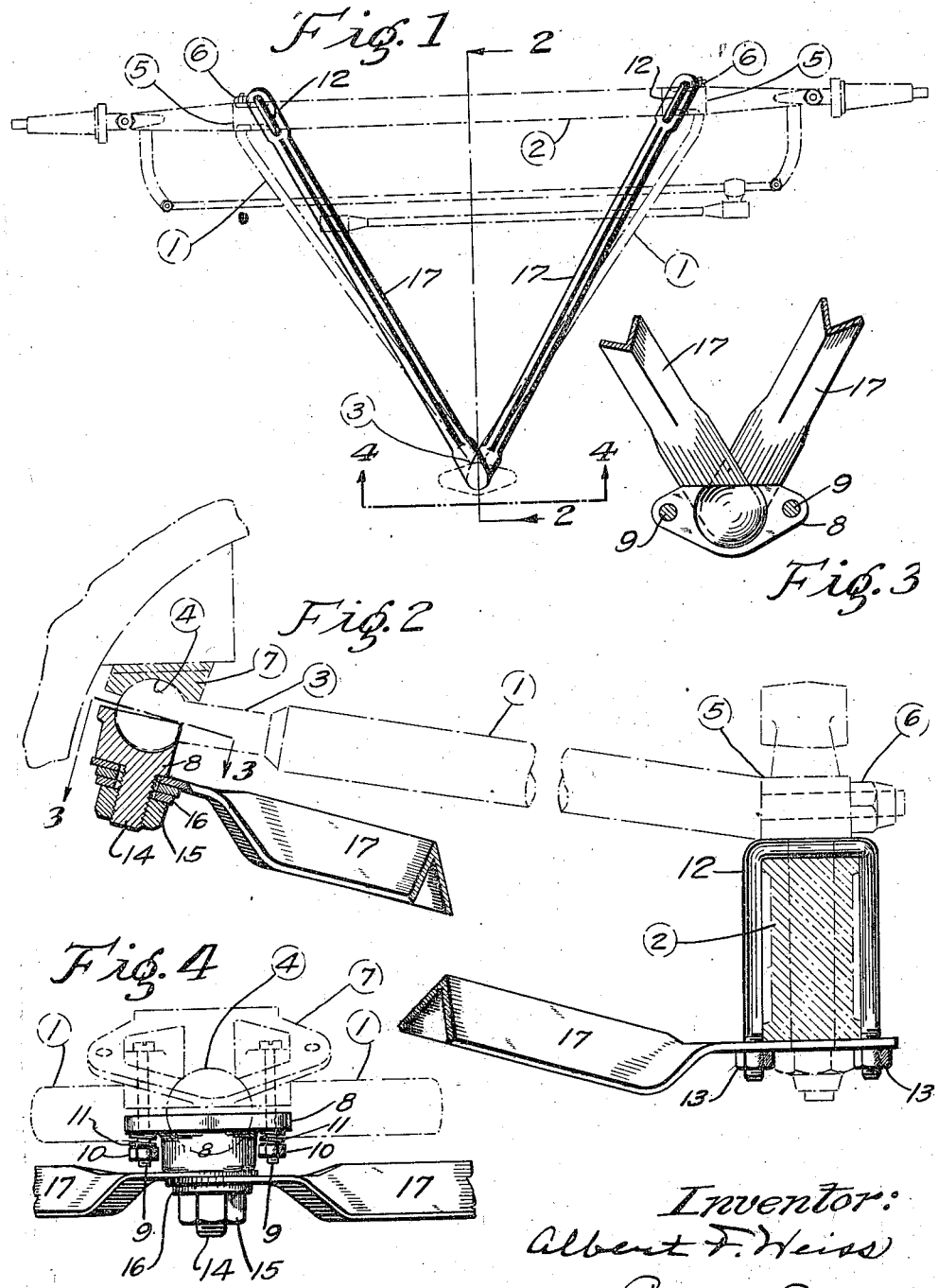

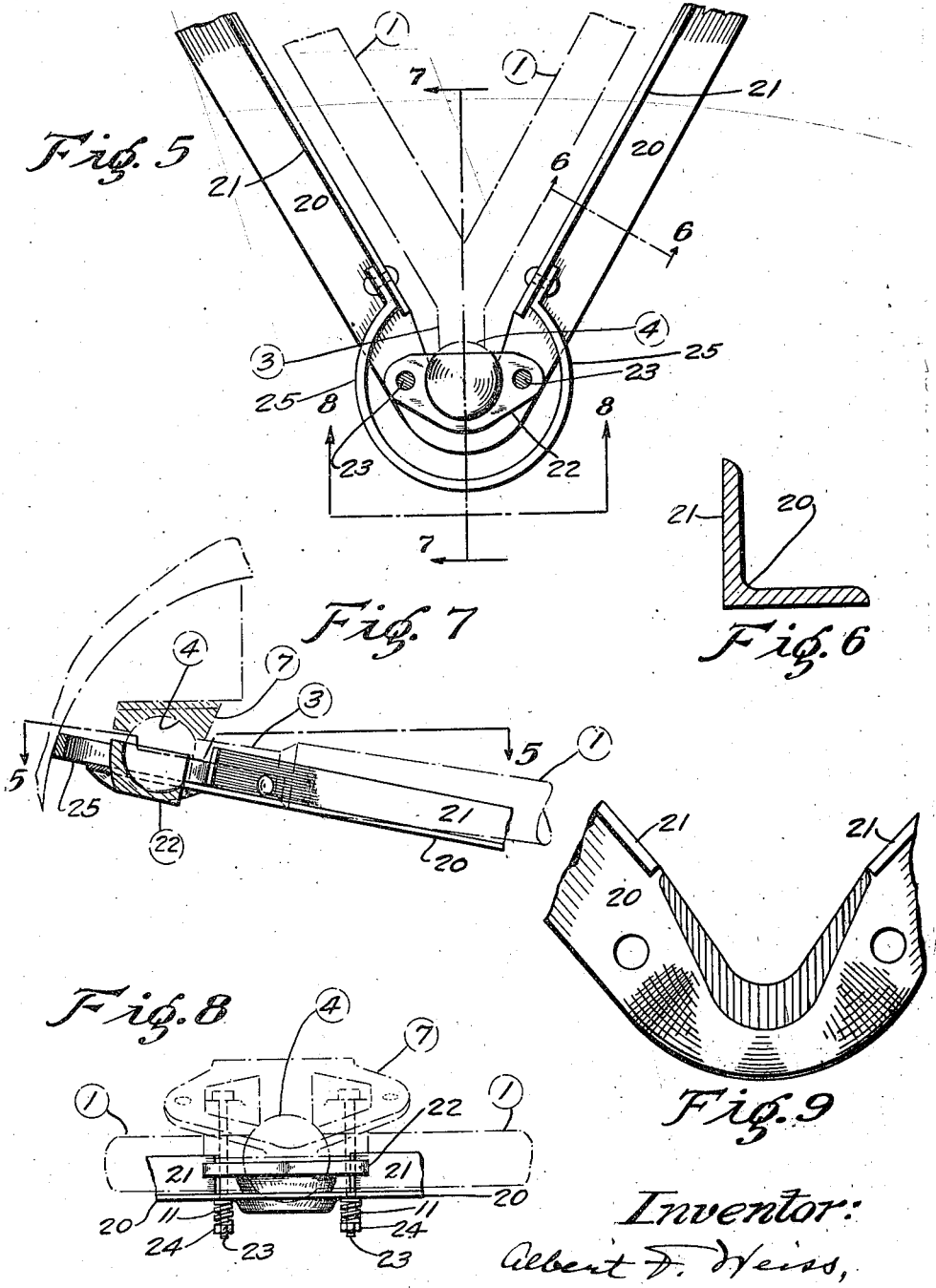

ALBERT F. WEISS, OF ST. LOUIS, MISSOURI.

AUXILIARY RADIUS-ROD.

1,281,239.  Specification of Letters Patent.  Patented Oct. 8, 1918.

Application filed February 11, 1918. Serial No. 216,567.

*To all whom it may concern:*

Be it known that I, ALBERT F. WEISS, a citizen of the United States, and a resident of the city of St. Louis and State of Missouri, have invented a new and useful Improvement in Auxiliary Radius-Rods, of which the following is a specification.

This invention relates to braces for use on motor vehicles, particularly to braces for the front axles of such vehicles, and has for its object to devise a brace which can be easily secured in place in the motor vehicle and which will form a strong brace for the front axle holding it in proper alinement and thus facilitating steering. The invention consists in an auxiliary radius rod and in means for securing it in position.

In the drawings, which form part of this specification and in which like numbers indicate like parts in the several views, Figure 1 is a plan view showing an embodiment of my invention in position;

Fig. 2 is a section on the line 2—2 in Fig. 1;

Fig. 3 is a detail view showing the crotch of the auxiliary radius rod;

Fig. 4 is an end elevation looking in the direction of the arrows 4—4 in Fig. 1 and showing the method of securing the radius rod and the auxiliary radius rod in position;

Fig. 5 is a plan view showing a modified form of auxiliary radius rod embodying my invention;

Fig. 6 is a section on the line 6—6 in Fig. 5;

Fig. 7 is a section on the line 7—7 of Fig. 5, looking in the direction of the arrows;

Fig. 8 is an end elevation looking in the direction of the arrows 8—8 in Fig. 5; and Fig. 9 is a plan view of the crotch of the modified form of auxiliary radius rod.

The radius rod is V-shaped and comprises two arms 1 which are attached at their outer ends to the upper side of the front axle 2, near its ends, and which unite at the other end, terminating in a reduced neck portion 3 having a spherical enlargement 4 at the end. The front end portions of the arms 1 are reduced and extend through holes provided therefor in enlarged portions of perch rods 5 on the upper side of the axle 2, and nuts 6 on the ends of the arms 1 hold them in position.

The radius rod has a ball and socket connection with the crank case of the motor vehicle. The socket member comprises an upper piece 7 which is rigidly secured to the crank case of the motor vehicle, and a lower piece 8. The lower piece 8 has a flange at the top, extending around the greater portion of its periphery, and is secured to the upper piece 7 by bolts 9 which pass through holes in the flange and which have nuts 10 at their lower ends. The spherical enlargement 4 on the end of the radius rod is preferably larger than the socket in which it is held, so that the two pieces of the socket member are spaced away from each other. Coil springs 11 are arranged on the bolts 9 between the nuts 10 and the under sides of the flange of the lower piece 8 of the socket member. There is thus a slight play between the two pieces of the socket member.

The auxiliary radius rod or brace illustrated in Figs. 1 to 4 comprises two angle irons 17 flattened at the ends, has substantially the same shape as the radius rod and is located beneath it. It is secured to the underside of the front axle 2 and to the underside of the lower piece 8 of the socket member. U-bolts 12 engage the front axle 2 adjacent to the perch rods 5. Said U-bolts 12 are arranged oblique to the axle, so that they have a clamping action. The free lower ends of the U-bolts 12 pass through holes provided therefor in the flattened end portions of the arms of the auxiliary radius rod. Nuts 13 on the ends of the U-bolts 12 hold the ends of the auxiliary radius rod in position against the underside of the axle.

For the lower socket member usually provided, I substitute a member 8 having a threaded lug 14 on its underside. Said lug 14 passes through alined holes in the meeting ends of the arms 17 of the auxiliary radius rod. A nut 15 and a washer 16 on the lug 14 secure the arms 17 in position against the lower socket member.

The modified form of auxiliary radius rod shown in Figs. 5–9 comprises a single V-shaped piece of metal 20 with up-turned flanges 21 along its inner margins. Said flanges 21 are cut away at the crotch of the V. The crotch bears against the under side of the lower socket member 22 and is shaped to follow the contour of said lower socket member 22 and fit snugly against it. The bolts 23, which secure the lower socket member 22 in place, also pass through holes in the auxiliary radius rod 20, and nuts 24 on the ends of the bolts 23 hold said auxiliary radius rod and said lower socket member in place. A flat spring 25 is riveted to the flanges 21 and serves as a buffer to prevent the end of the auxiliary radius rod from injuring the crank case, when a shock thrusts the auxiliary radius rod backward. The ends of the auxiliary radius rod are secured to the front axle in the manner described above.

It has been found that the ordinary radius rod, being secured only to the upper side of the front axle, does not brace the axle sufficiently. Auxiliary radius rods of the kind described hold the axle securely in alinement, because they brace the axle on its under side as well as on its upper side. The auxiliary radius rod is not secured to the radius rod and thus places no strain on the radius rod. The auxiliary radius rod strengthens the radius rod from end to end, and the method of attaching it does not interfere with the play between the two socket members. If the radius rod breaks, the auxiliary radius rod will still hold the axle in alinement. The method of attaching the auxiliary radius rod to the front axle makes possible the use of the bolts of the perch rods to secure shock absorbers or other devices in place.

It is evident that changes may be made both in the form of the brace and in the means for securing it in place, without departing from the invention, and I do not wish to be limited to the precise construction shown.

I claim the following as my invention:

1. The combination of a V-shaped radius rod having its apex formed into a ball, socket members resiliently assembled to constitute a socket for said ball, and a V-shaped auxiliary radius rod having its apex connected to the lower socket member.

2. The combination of a V-shaped radius rod secured to the front axle of a motor vehicle and having a ball and socket connection with the crank case of said motor vehicle at the other end, and a V-shaped auxiliary radius rod, said auxiliary radius rod being secured at its outer ends to the underside of the front axle, and at the crotch to the under side of the socket member in which said radius rod is held, said socket member being resiliently held.

3. In a motor vehicle, a radius rod construction comprising a V-shaped radius rod and a V-shaped auxiliary radius rod, said radius rod having a ball and socket connection with the crank case of said motor vehicle, the socket member comprising upper and lower pieces, means for resiliently securing the two pieces of said socket member together, and means for securing said auxiliary radius rod to the lower piece of said socket member.

4. In a motor vehicle, a radius rod construction comprising a bifurcated radius rod, a bifurcated brace for said radius rod, a socket member for holding the end of said radius rod, said socket member being yieldably secured in place, and means on said socket member for securing the end of said brace in position, said means comprising a threaded lug depending from said socket member.

5. In a motor vehicle, a radius rod construction comprising a V-shaped radius rod having a spherical enlargement at the end, a V-shaped auxiliary radius rod, a socket member comprising upper and lower pieces for holding the end of said radius rod, a lug on the lower piece of said socket member, said lug passing through a hole provided therefor in said auxiliary radius rod and a nut on said lug for holding said auxiliary radius rod in place on said lug.

6. In a motor vehicle the combination of an auxiliary radius rod comprising outwardly diverging arms, yieldable means arranged on the crank case of the motor vehicle for securing the rear end of said auxiliary radius rod in position, and means for securing the outer ends of said arms to the under side of the front axle, said means comprising U-bolts arranged on said front axle with their free ends projecting below the axle and passing through holes provided therefor in the arms of the radius rod, said U-bolt being disposed obliquely to said axle, and nuts on the ends of said U-bolt for holding said auxiliary radius rod in position against the under side of the axle, whereby said rod is firmly held.

Signed at St. Louis, Missouri, this 7th day of February, 1918.

ALBERT F. WEISS.